United States Patent
Yanai et al.

Patent Number: 5,341,493
Date of Patent: Aug. 23, 1994

[54] DISK STORAGE SYSTEM WITH WRITE PRESERVATION DURING POWER FAILURE

[75] Inventors: Moshe Yanai, Framingham; Natan Vishlitzky, Brookline; Bruno Alterescu, Newton; Daniel Castel, Framingham, all of Mass.

[73] Assignee: EMC Corporation, Hopkinton, Mass.

[21] Appl. No.: 156,394

[22] Filed: Nov. 22, 1993

Related U.S. Application Data

[63] Continuation of Ser. No. 586,254, Sep. 21, 1990, abandoned.

[51] Int. Cl.$^5$ .................................................. G06F 12/02
[52] U.S. Cl. ......................... 395/425; 364/DIG. 1; 364/243.41; 364/260.1; 395/575; 395/750
[58] Field of Search ............... 395/400, 425, 575 MS, 395/750 MS; 364/200 MS File, 900 MS File

[56] References Cited

U.S. PATENT DOCUMENTS

| | | | |
|---|---|---|---|
| 4,055,851 | 10/1977 | Jenkins et al. | 395/425 |
| 4,084,231 | 4/1978 | Capozzi et al. | 395/425 |
| 4,149,239 | 4/1979 | Jenkins et al. | 395/325 |
| 4,458,316 | 7/1984 | Fry et al. | 395/250 |
| 4,506,323 | 3/1985 | Pusic et al. | 395/425 |
| 4,523,206 | 6/1985 | Sasscer | 395/425 |
| 4,530,054 | 7/1985 | Hamstra et al. | 395/550 |
| 4,530,055 | 7/1985 | Hamstra et al. | 395/425 |
| 4,598,362 | 7/1986 | Kinjo et al. | 395/250 |
| 4,638,425 | 1/1987 | Hartung | 395/425 |
| 4,658,352 | 4/1987 | Nagasawa | 395/575 |
| 4,811,203 | 3/1989 | Hamstra et al. | 395/425 |
| 4,835,686 | 5/1989 | Furuya et al. | 395/425 |
| 4,905,196 | 2/1990 | Kirrmann | 365/200 |
| 4,920,478 | 4/1990 | Funiya et al. | 395/425 |
| 5,007,027 | 4/1991 | Shimoi | 365/229 |
| 5,109,505 | 4/1992 | Kihara | 395/575 |
| 5,132,871 | 7/1992 | Densham et al. | 361/380 |
| 5,204,965 | 4/1993 | Guthery et al. | 395/800 |

*Primary Examiner*—Joseph L. Dixon
*Assistant Examiner*—Hiep T. Nguyen
*Attorney, Agent, or Firm*—Daniel J. Bourque; Anthony G. M. Davis; Bujold, Michael J.

[57] ABSTRACT

A disk storage system including means for assuring completion of data writes to a data storage disk upon failure of electrical power receives data write commands including data to be written to one or more storage disks. Temporary memory storage temporarily stores the write commands including data to be written to one or more storage disks. The system generates a disk write pending indicator associated with each datum to be written to the one or more storage disks, for indicating that the data stored in the temporary memory must be written to disk. A disk director searches the temporary memory storage for data stored in the temporary memory storage that must be written to disk as indicated by the associated data write pending indicator, for writing the data to the one or more storage disks. Also included are means for providing electrical power to the one or more storage disks, the temporary memory storage and the disk director upon the failure of main electrical power, for assuring completion of write commands stored in the temporary memory storage to one or more storage disks upon the failure of main electrical power.

15 Claims, 2 Drawing Sheets

DISK STORAGE SYSTEM WITH WRITE PRESERVATION DURING POWER FAILURE

This application is a continuation of application Ser. No. 07/586,254, filed Sep. 21, 1990, now abandoned.

FIELD OF THE INVENTION

This invention relates to direct access data storage systems and more particularly, to disk storage systems.

BACKGROUND OF THE INVENTION

In order to improve the performance of direct access data storage systems utilizing slower access storage devices such as disk drives, such systems are provided with intermediary temporary memory storage commonly known as cache memory.

In operation, a host computer sends a disk store or write command to the storage system accompanied by the data to be stored. In order to improve performance, the storage system accepts the write command and associated data and temporarily stores the information in cache memory. The storage system then acknowledges a successful "write" of the data to the host. Thus, the host believes that the data is now permanently written to disk storage. At a later time when the disk storage system is not receiving requests for reading or writing data to any of the storage disks, the storage system will process all the data stored in its cache memory which the system can identify as requiring writing to the disk drive. In this manner, a host accessing a data storage system with a write command is not kept waiting or does not tie up the storage system while the storage system and disk drive controllers search for the data to be updated, or search for the location on the disk drive to which the data is to be written.

A problem with serious consequences arises, however, when a power failure occurs after the host computer has written the data to the storage system and prior to the storage system transferring the data from cache memory to the selected disk drive.

Prior art attempts at solving this problem have focused on providing battery backup for the volatile cache memory which is generally comprised of Dynamic Random Access Memory (DRAM). For example, one such system provides battery backup for the cache memory for a period of approximately 48 hours. However, should a power failure occur over a weekend or holiday, the battery backup system often does not supply enough power to maintain the data in the cache memory until the power failure can be identified and remedied. Additionally, if the battery backup is not fully charged or discharges more quickly than anticipated, the battery backup system may not provide adequate power to the cache memory for the full intended period. In either case, the data which the host thought was permanently written to disk storage may be irretrievably lost.

SUMMARY OF THE INVENTION

This invention relates to a reliable disk storage system with write preservation, for assuring completion of data writes to a storage disk upon failure of main electrical power. The system includes means for receiving write commands to one or more storage disks. The write commands include data to be written to the disks. Temporary memory storage means recieve the write commands and data to be written to the disk. Further included are disk write pending indicator means associated with each datum to be written to the disk, for indicating that the datum stored in the temporary memory storage must be written to the disk. Also provided, are means for reading the data stored in the temporary memory to be written to the disk as indicated by the data write pending indicator, and for writing the data to the disk drives. Additionally, the system includes means for providing electrical power to the one or more storage disks, to the means for writing data to the disk, and to the temporary memory storage means upon loss of main electrical power, for providing power to the system for assuring completion of data writes to the storage disks.

In the preferred embodiment, the means for writing data to the disk drives includes a disk adapter board and the disk write pending indicator means includes at least one write pending flag bit associated with each datum to be written to disk. As the data is written to disk, the disk adapter clears the write pending flag bit associated with each datum. Additionally, after all of the write pending flag bits have been cleared, the disk director shuts off the means for providing electrical power after loss of the main electrical power.

BRIEF DESCRIPTION OF THE DRAWINGS

These, and other features and advantages of the present invention are described below in the following description and the accompanying drawings, in which.

DETAILED DESCRIPTION OF THE INVENTION

Figure 1:
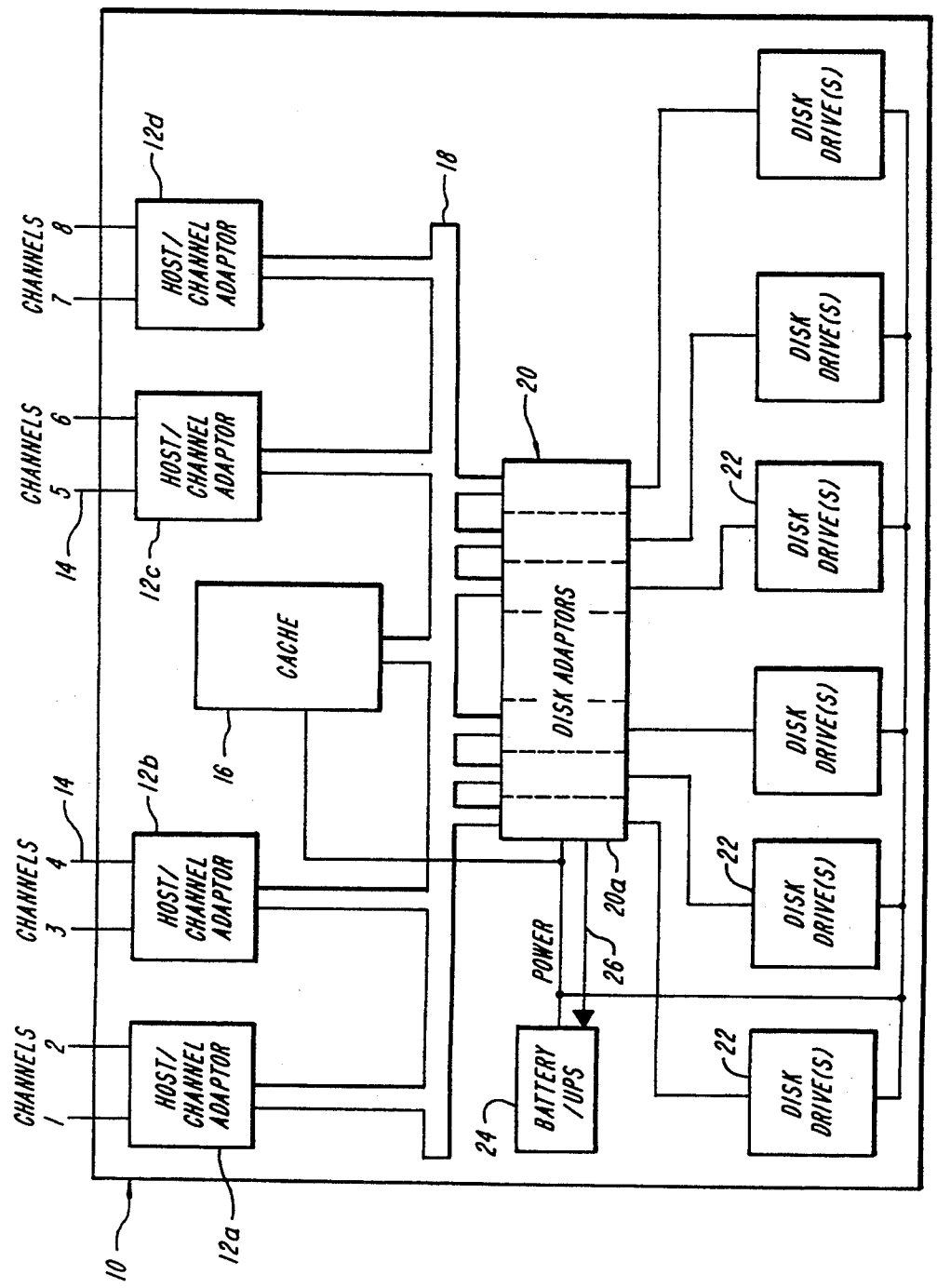
FIG. 1 is a block diagram of the disk storage system with write preservation according to the present invention.

In accordance with the present invention, the disk storage system 10, FIG. 1, with write preservation during power failure includes one or more means for receiving write commands and data such as host/channel adapter boards 12a–12d. The channel adapter boards are adapted to receive disk read/write commands and data over a plurality of communication channels such as channels 14 from one or more host computers (not shown).

The channel adapter boards 12a–12d are connected to temporary or cache memory storage unit 16 by means of bus 18. Bus 18 is also connected with one or more disk director/adapter boards 20 which serve to write data to one or more disk drive units 22.

Each of the disk drive units 22 may include one or more disk drives, dependent upon the user's requirements. Also included in the system is one or more battery/uninterruptable power supply (UPS)/battery unit 24.

Upon detecting power failure, the uninterruptable power supply 24 maintains power to disk adapters 20, cache 16, and disk drive unit 22, until all data write commands and associated data pending in cache 16 have been serviced and written to the appropriate disk drive 22.

In operation, the disk storage system with write preservation during power failure receives data write commands along with the accompanying data over one or more channels 14 from one or more host computers. One or more host/channel adapter boards 12a–12d receive the write commands and associated data. In order to improve system performance, the disk storage system of the present invention does not wait for disk adapters 20 to locate and update the data on the appropriate disk drives but rather, the channel adapter boards store the data in temporary memory storage unit 16.

In addition to storing the data that must be written to one or more disk drives 22, channel adapter boards 12a–12d store an indication associated with each data record that must be written to disk, indicating to the disk adapters 20 that the data must be written to the disk drives.

Figure 2A:
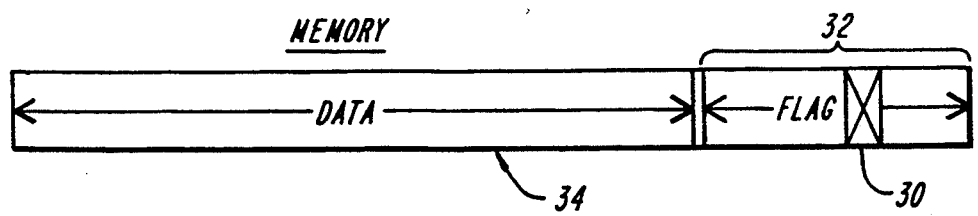
FIGS. 2A and 2B illustrate alternative methods of storing data and its associated write pending flag bit in the temporary memory storage.
Figure 2B:
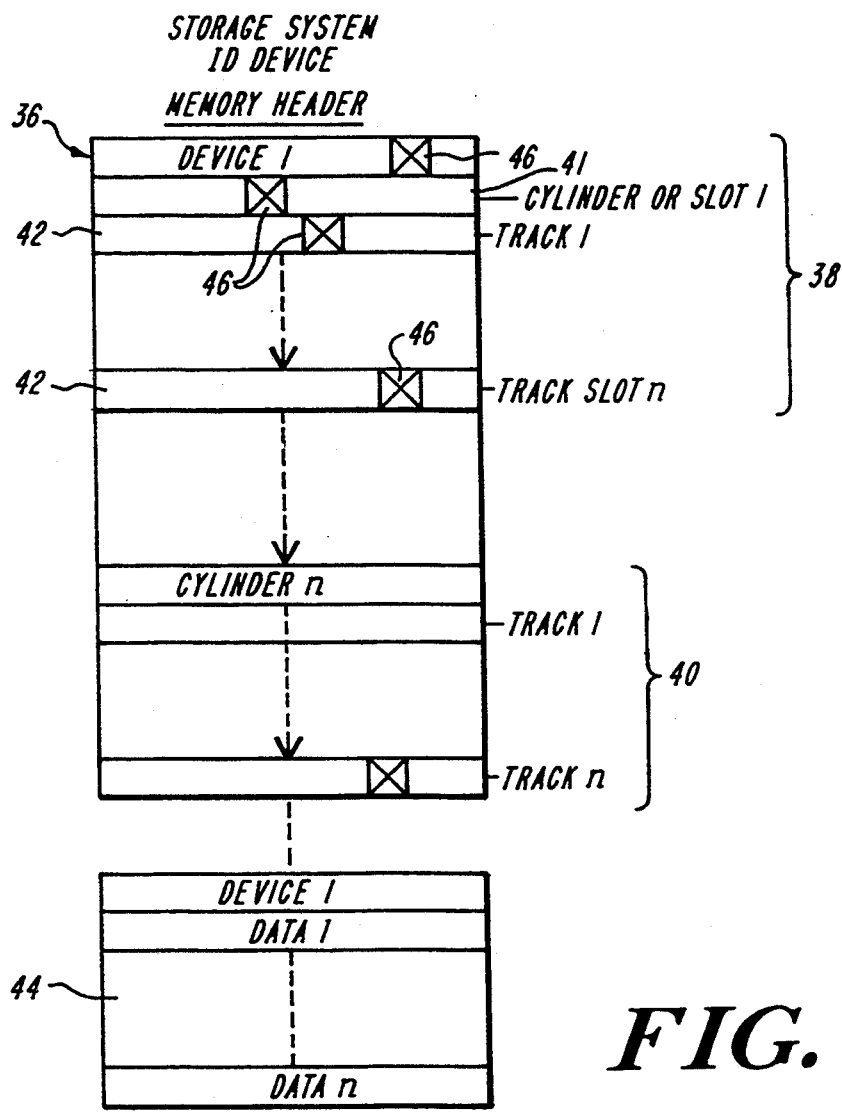

Such a disk write pending indicator includes, for example, a flag bit such as bit 30, FIG. 2A which may be part of one or more additional flag bits 32 appended to data record 34. In a preferred embodiment, disk adapter boards 20 establish a disk storage system identification region 36 within temporary memory storage unit 16. The disk storage system identification region includes a plurality of blocks of memory locations such as blocks 38 and 40 corresponding to a physical device such as a disk drive connected to the system. Each block of memory locations 38, 40 is further divided into a device header region 41 and a plurality of track slots such as track slots 42 corresponding to all the tracks on a given device or disk drive. Data records 44 associated with a given device are stored in another region of the temporary memory storage unit 16.

Since the user may request that certain frequently accessed data records be stored in temporary memory storage unit 16 for quicker access to the data, not all records in record segment 44 will require updating and subsequent writing to disk. Accordingly, when a write command is received from a host computer, the appropriate channel adapter board writes the data to the temporary memory storage unit 16 and sets a corresponding write pending flag bit 46 in both the device header region 41 and the appropriate track and/or cylinder headers 42 region of the temporary memory storage unit.

When one or more disk adapters 20 are not handling data read or write commands from a host computer, the disk directors/adapters perform an orderly search of the disk storage system identification region 36 searching for write pending flag bits 46. Upon discovering a set write pending flag, the disk adapters retrieve the data from data storage region 44 and write the data to the appropriate disk drive.

During a power failure, no current read or write commands will be received from a host computer since the host/channel adapter boards 12a–12d receive no power. However, since uninterruptable power supply/battery unit 24 provides power to cache memory 16, disk adapters 20, and disk drives 22, the disk adapters will continue to search cache memory 16 for write pending flags, and will continue to write data to disk. After writing the data, the disk adapters will clear or reset the write pending flag, thus assuring that all data write commands received from the host computer will be completed. Since only the data with write pending flag bits set is written to disk, the present system greatly speeds up to process of writing data to disk during a power failure.

Upon the servicing of all of the write pending flags, one or more of the disk director/adapter boards 20 which serves as the main disk director such as disk adapter board 20a, will assert a signal over signal path 26 to the uninterruptable power supply unit 24 causing the unit to shut down, awaiting the return of main electrical power.

Modifications and substitutions of the present invention by one of ordinary skill in the art are considered to be within the scope of the present invention and the claims which follow.

We claim:

1. A disk storage system with write preservation, for assuring completion of data write commands for received data which is to be written to a data storage disk upon the failure of main electrical power, comprising:

at least one host computer, for issuing at least data write commands including data to be written to one or more storage disks;

at least one data receiver, for receiving said data write commands including said received data to be written to one or more data storage disks, and for storing each of said received data write commands including said data to be written to disk in a directly addressable temporary memory storage area;

said at least one data receiver establishing, in said directly addressable temporary memory storage area, at least one data storage system identification table including at least one data storage disk write pending indicator storage region, for storing at least one write pending indicator associated with each of said one or more data storage disks for which at least one data write command including data to be written to disk is received and pending, and for storing at least one data storage disk write pending indicator associated with each datum to be written to said data storage disk;

at least one disk controller, for searching said data storage system identification table in said directly addressable temporary memory storage area for data stored in said temporary memory storage area to be written to said one or more data storage disks as indicated by said associated data write pending indicator, for writing said data to said one or more data storage disks, and for clearing the at least one write pending indicator associated with each datum as each datum is written to disk, and for clearing the write pending indicator for each data storage disk after all write pending indicators associated with each datum for said each data storage disk has been cleared; and a source of backup electrical power, for providing electrical power to said one or more data storage disks, said directly addressable temporary memory storage area and said means for searching and writing, upon the failure of main electrical power, for assuring completion of write commands as indicated by said write pending indicators stored in said directly addressable temporary memory storage area upon the failure of main electrical power.

2. A method assuring completion of data writes to a data storage disk upon the failure of main electrical power, comprising the steps of:

receiving data write commands including data to be written to one or more data storage disks, and for storing each of said received data write commands including said data to be written to disk in a temporary memory storage area, said temporary memory storage area also including data not to be written to disk;

establishing, in said temporary memory storage area, at least one data storage system identification table including a plurality of write pending indicator storage regions, for storing at least one write pending indicator associated with each of said one or more data storage disks for which at least one data write command including data to be written to disk is received and pending, and for storing at least one data storage disk write pending indicator associated with only each datum to be written to said data storage disk;

upon the failure of main electrical power, performing the steps of:

providing backup electrical power to at least said one or more data storage disks, said temporary memory storage area and said means for searching and writing;

searching said data storage system identification table in said temporary memory storage area for data stored in said temporary memory storage area to be written to said one or more data storage disks as indicated by said data write pending indicator associated with each of said one or more data storage disks for which at least one data write command including data to be written to disk is received and pending, and by said at least one disk write pending indicator associated with only each datum to be written to said one or more storage disks, for writing only said data received and for which a write pending indicator is pending to said one or more data storage disks;

clearing the at least one write pending indicator associated with each datum to be written to disk as each datum is written to said disk;

clearing the write pending indicator for each data storage disk after all write pending indicators associated with each datum for said each data storage disk has been cleared, for assuring completion of write commands as indicated by said write pending indicators stored in said data storage system identification table upon the failure of main electrical power; and turning off said back up electrical power after all write pending indicators have been cleared.

3. A disk storage system with write preservation, for assuring completion of data writes to a data storage disk upon the failure of main electrical power, comprising:

at least one host computer, for issuing at least data write commands including data to be written to one or more storage disks;

means for receiving said data write commands including data to be written to one or more storage disks directly addressable temporary memory storage means, responsive to said means for receiving, for temporarily storing each of said received data write commands including data to be written to said one or more storage disks, and for storing data which does not have to be written to said one or more storage disks;

means, responsive to said means for receiving, for generating in said directly addressable temporary memory storage means, at least one disk write pending indicator associated with only each datum to be written to said one or more storage disks, for indicating that said associated data stored in said directly addressable temporary memory storage means must be written to disk, and for generating at least one write pending indicator associated with each of said one or more data storage disks for which at least one data write command including data to be written to disk is received and pending;

means for searching said directly addressable temporary memory storage means for data stored in said temporary memory storage means to be written to said one or more storage disks as indicated by at least one write pending indicator associated with each of said one or more data storage disks for which at least one data write command including data to be written to disk is received and pending, and by said at least one disk write pending indicator associated with only each datum to be written to said one or more storage disks, and for writing said data to said one or more storage disks; and means for providing electrical power to said one or more storage disks, said directly addressable temporary memory storage means, and said means for searching and writing upon the failure of main electrical power for a period of time required to write all data stored in said temporary memory storage means that must be written to disk, for assuring completion of write commands stored in said directly addressable temporary memory storage means to one or more storage disk upon the failure of main electrical power.

4. The system of claim 3 wherein said disk write pending indicator means includes at least one write pending flag bit associated with each datum to be written to disk.

5. The system of claim 4 wherein said means for searching and writing includes disk director means and, wherein said disk director means clears the at least one pending flag bit as each datum is written to disk.

6. The system of claim 5 wherein said disk director means shuts off said means for providing electrical power after all write pending flag bits have been cleared.

7. The system of claim 4 wherein each datum to be written to disk includes its associated write pending flag bit appended to the datum.

8. The system of claim 4 wherein said temporary memory storage means includes one or more write pending flag memory storage locations, for storing one or more write pending flag bits apart from its associated datum.

9. The system of claim 4 wherein said means for searching and writing first searches for a writing pending indicator associated with each respective one of said one or more data storage disks to determine that at least one write is pending for said respective disk before searching said temporary memory storage means for data stored to be written to a data storage disk as indicated by an associated write pending indicator.

10. The system of claim 3 wherein said temporary memory storage means includes solid state memory.

11. The system of claim 10 wherein said solid state memory includes dynamic RAM.

12. The system of claim 3 wherein said means for receiving write commands includes one or more host adaptor means, coupled to means for issuing write commands and to said temporary memory storage means, for receiving said write commands including data, and for storing said write commands and data in said temporary memory storage means.

13. The system of claim 3 wherein said means for providing electrical power upon loss of main electrical power includes a battery.

14. The system of claim 3 wherein said means for providing electrical power upon loss of main electrical power includes an uninterruptable power supply.

15. The system of claim 3 wherein said means for receiving said write commands includes said means for generating a disk write pending indicator.

* * * * *